United States Patent [19]

Gomi et al.

[11] Patent Number: 5,729,736
[45] Date of Patent: Mar. 17, 1998

[54] ACCESS ANALYSIS METHOD AND SYSTEM IN PARALLEL DATA BASE SYSTEM

[75] Inventors: Fumio Gomi; Kazutoshi Amano; Tomohiro Sakaue, all of Yokohama; Hiroyuki Shinozaki; Masahiko Hashimoto, both of Fujisawa; Takafumi Nogami, Yokohama; Shigehiro Hatakeyama, Yokohama; Takenori Iwato, Yokohama, all of Japan

[73] Assignees: Hitachi, Ltd., Tokyo; Hitachi Software Engineering Co., Ltd., Yokohama, both of Japan

[21] Appl. No.: 660,762

[22] Filed: Jun. 10, 1996

[30] Foreign Application Priority Data

Jun. 13, 1995 [JP] Japan ............... 7-145847

[51] Int. Cl.6 .............................. G06F 17/30
[52] U.S. Cl. .......................... 395/610; 395/602
[58] Field of Search ....................... 395/60, 61

[56] References Cited

U.S. PATENT DOCUMENTS

| 5,325,525 | 6/1994 | Shan et al. | 395/650 |
| 5,469,568 | 11/1995 | Schiefer et al. | 395/602 |
| 5,515,488 | 5/1996 | Hoppe et al. | 395/140 |
| 5,590,319 | 12/1996 | Cohen et al. | 395/604 |
| 5,634,125 | 5/1997 | Li | 395/619 |

*Primary Examiner*—Wayne Amsbury
*Attorney, Agent, or Firm*—Antonelli, Terry, Stout & Kraus, LLP

[57] ABSTRACT

A method and a system for analyzing the operation of a parallel data system are disclosed. The history information of the access executed by a specific processor that has received a request for access to a plurality of data bases connected to a plurality of processors, the ID of the specific processor and the accessed data amount are collected and stored in a memory. The history information is compared with the time assumed from a predetermined time specified for the access to a unit amount of data in data bases, deciding whether the former is reasonable or longer than the latter. The transfer history information for the processor that has transferred an access request to the specific processor executing the access is compared with a predetermined transfer time specified for a unit amount of data, deciding whether the transfer time between the two processors is longer than an assumed transfer time. It is thus possible to determine whether an abnormal condition of the parallel data base system is caused by an internal fault of the processors or due to a defect of the access request transfer path between processors.

23 Claims, 7 Drawing Sheets

FIG.3

| PROCESSING REQUEST TYPE | SPECIFIED PROCESSING TIME | UNIT INFORMATION LENGTH |
|---|---|---|
| SQL COMPILE REQUEST | 1ms | PER 100 BYTES |
| KEY SEARCH REQUEST | 1ms | PER 100 BYTES |
| DATA ADD REQUEST | 1ms | PER 100 BYTES |
| DATA UPDATE REQUEST | 1ms | PER 100 BYTES |
| DATA DELETE REQUEST | 1ms | PER 100 BYTES |
| COMMIT REQUEST | 1ms | — |
| SEARCH RESULT TRANSFER REQUEST | 1ms | PER 100 BYTES |

FIG.4

| PROCESSING TYPE | SPECIFIED PROCESSING TIME | UNIT NUMBER OF PROCESSES |
|---|---|---|
| SQL COMPILE | 10ms | ONE |
| DATA BASE SEARCH | 20ms | ONE |
| DATA BASE ADDITION | 20ms | ONE |
| DATA BASE UPDATING | 20ms | ONE |
| DATA BASE DELETION | 20ms | ONE |
| COMMIT PROCESSING | 20ms | ONE |
| SEARCH RESULT TRANSFER | 1ms | PER 100 BYTES |

FIG.5

| NO. | TIME | PROCESSING REQUEST TYPE | PROCESSOR NAME | NUMBER OF PROCESSES | PROCESSING CONDITION |
|---|---|---|---|---|---|
| 1 | hh:mm:ss:xxx | KEY SEARCH REQUEST | NAME 01 | 200BYTES | NORMAL |
| 2 | hh:mm:ss:xxx | KEY SEARCH ACCEPTANCE | NAME 01 | 01 | NORMAL |
| 3 | hh:mm:ss:xxx | KEY SEARCH ACCEPTANCE | NAME 02 | 01 | NORMAL |
| 4 | hh:mm:ss:xxx | KEY SEARCH OVER | NAME 02 | 10 | NORMAL |
| 5 | hh:mm:ss:xxx | KEY SEARCH OVER | NAME 01 | 20 | NORMAL |
| ⋮ | ⋮ | ⋮ | ⋮ | ⋮ | ⋮ |

45

ACCESS ANALYSIS METHOD AND SYSTEM IN PARALLEL DATA BASE SYSTEM

BACKGROUND OF THE INVENTION

The present invention relates to an access analysis in a parallel data base system.

In a conventional method of evaluating the parallel operation of a parallel computer, the operation history information is collected for each processor making up the parallel computer, and the operation process of each processor is explicitly indicated on the basis of this information, so that the parallel operation is evaluated by visually comparing the operation processes of the respective processors.

U.S. Pat. No. 5,325,525 and JP-A-5-81221 disclose a parallel program development system and a task scheduling for a parallel computer system having multiple resources.

According to the prior art, the parallel operation processes among a plurality of processors are correlated visually and manually. In a parallel data base system, however, a great number of processors are operated in parallel to each other with a great number of access requests being made to the data base. The problem thus is posed that an objective evaluation is difficult.

SUMMARY OF THE INVENTION

An object of the present invention is to provide an operation analysis system, a storage medium therefor, and method in which the operation of a parallel data base access system is analyzed by an objective technique thereby to contribute to a tune-up of the system performance.

Another object of the invention is to provide an operation analysis system, a storage medium therefor, and method in which an abnormal operation time is detected by the use of the processing time for information transfer between the processors and the processing time for data base access in each processor.

According to one aspect of the invention, there is provided an operation analysis method for a parallel data base system, in which the history information of the initiation time and termination time of the data base access processing is acquired and collected for each of the processors constituting a parallel data base system, the initiation time and the termination time of the data base access processing are made to correspond with each other for a given processor, and the processing time calculated from the termination time and the initiation time of each processor is checked whether it exceeds a predetermined length of time.

According to another aspect of the invention, there is provided an operation analysis method for a parallel data base system, in which the history information of the time when the data base access processing request had been issued from one of a plurality of processors to other processors are acquired, and the time the request was issued is made to correspond to the initiation time of the data base access processing by each of the other processors. The time for transfer and processing calculated from the initiation time and the request issue time thus made to correspond with each other as described above is checked to decide whether it exceeds a predetermined time length.

The history information of the initiation time and the termination time of the data base access processing acquired for each processor is collected and sorted by time. Then the history information for all the processors making up a parallel data base system are aligned in time sequences. The initiation time and the termination time of the data base access processing of the same type are made to correspond to each other for the history information of the same processor, and the initiation time is subtracted from the termination time, thereby producing the processing time. In the case where the processing time thus calculated exceeds a predetermined allowable time length, such a processing time is detected as an abnormal operation time. Upon occurrence of an abnormal operation time, the cause thereof is traced for a successful system performance tune-up.

In similar fashion, a major portion of the processing time required from the time when a given processor issues a data base access processing request to another processor to the time when the particular another processor begins the data base access processing constitutes an information transfer time between the processors. In the case where this processing time is abnormal, the hardware/software related to the inter-processor communication provides an object of system performance tune-up.

BRIEF DESCRIPTION OF THE DRAWING

FIG. 3 is a diagram showing an example of information on the specified inter-processor operation time according to an embodiment.

FIG. 4 is a diagram showing an example of information on the specified intra-processor operation time according to an embodiment.

FIG. 5 is a diagram showing an example of accumulated history information according to an embodiment.

DESCRIPTION OF THE PREFERRED EMBODIMENTS

An embodiment of the invention will be described in detail below with reference to the accompanying drawings.

Figure 1:
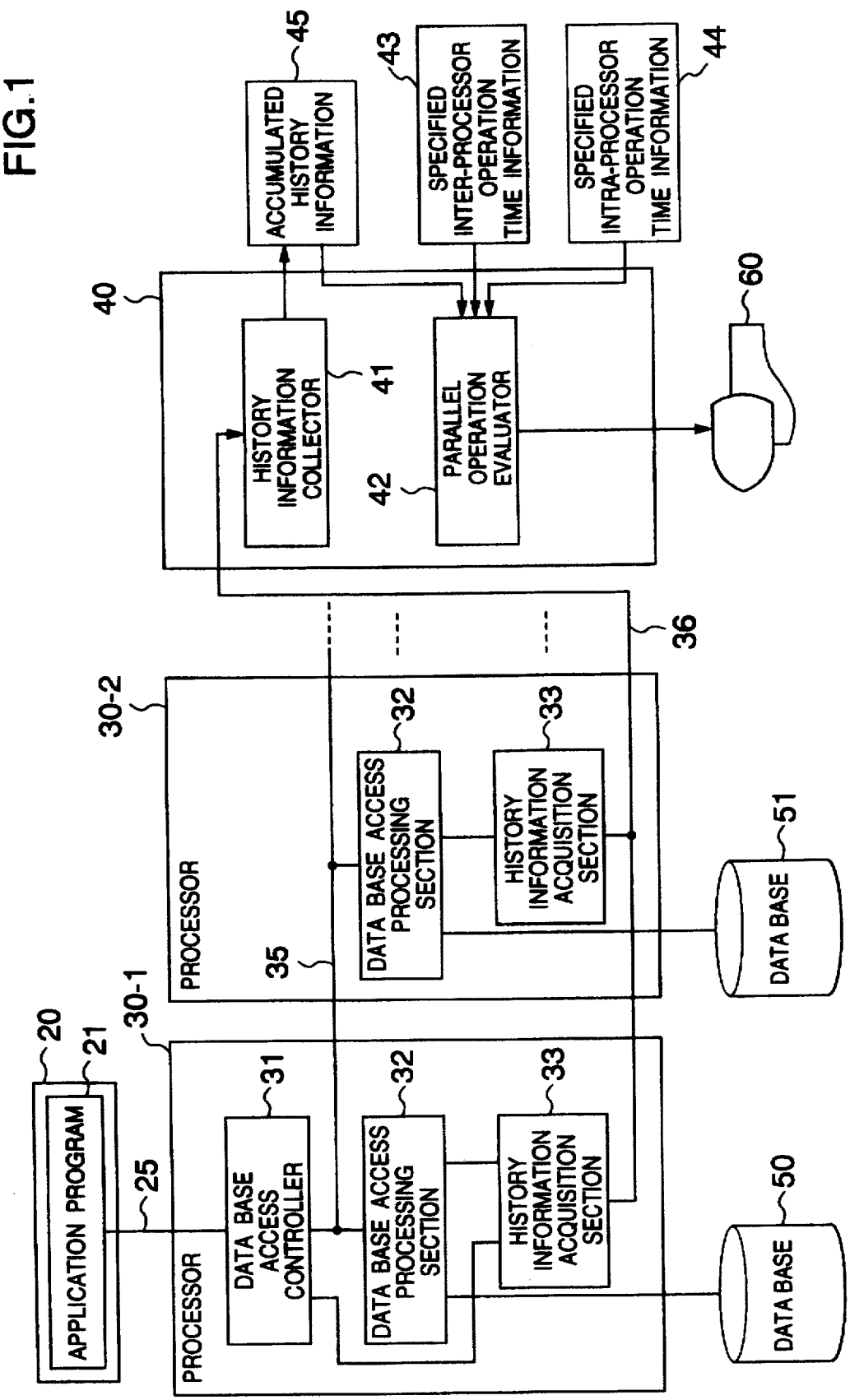
FIG. 1 is a block diagram showing a general configuration of a system including a parallel relational data base system according to an embodiment.

FIG. 1 is a block diagram showing a configuration of a system comprising a parallel data base system according to an embodiment of the invention. A processor 20 incorporates an application program 21. The application program 21 is a program including a command for issuing an access request to the data base. The parallel data system includes a plurality of processors 30. A communication path 25 connects the processor 20 with one of a set of processors 30. Data bases 50, 51 are connected to the processors 30 respectively, and are incorporated in a memory unit. A data base access controller 31 is incorporated in one of the processors 30 for accepting and analyzing an access request from the application program 21 to the data bases 50, 51 and so on and issuing a physical input-output command. A data base access processing section 32 is incorporated in each of the processors 30 for executing a parallel input-output operation for the data bases 50, 51 and so on in response to a command from the data base access controller 31. An inter-processor communication means 35 connects a plurality of processors 30. A history information acquisition section 33 is incorporated in each processor 30 for acquiring the operation history information of the data base access performed by the data base access controller 31 and each of the data base access processing sections 32. The processors 30, the data bases 50, 51 and so on connected to the respective processors, the data base access controller 31, the data base access processing sections 32 and the inter-processor communication means 35 constitute a parallel data base system. A processor 40 evaluates the parallel operation. An inter-processor communication means 36 connects each of the processor 30 to the processor 40. A common communication means may be shared by the inter-processor communication means 35 and the inter-processor communication means 36. A history information collector 41 is incorporated in the processor 40 and connected to the history information acquisition sections 33 through the inter-processor communication means 36 for collecting the history information acquired by the history information acquisition sections 33 and storing the accumulated history information in an region 45. The history information collector 41 may sort the acquired history information on the basis of the initiation/termination time to assure an efficient analysis. A parallel operation evaluator is incorporated in the processor 40 for evaluating the parallel operation time with reference to the specified inter-processor operation time information of the region 43 and the specified intra-processor operation time information of the region 44 on the basis of the accumulated history information of the region 45. An output device 60 is a printer or a display unit, for example, connected to the processor 40 for outputting the evaluation result from the parallel operation evaluator 42. The regions 43, 44 and 45 are assigned in the storage unit of the processor 40. The data base can be of various types including the relational data base, the hierarchical data base, the network data base and the geometric data base.

Figure 2:
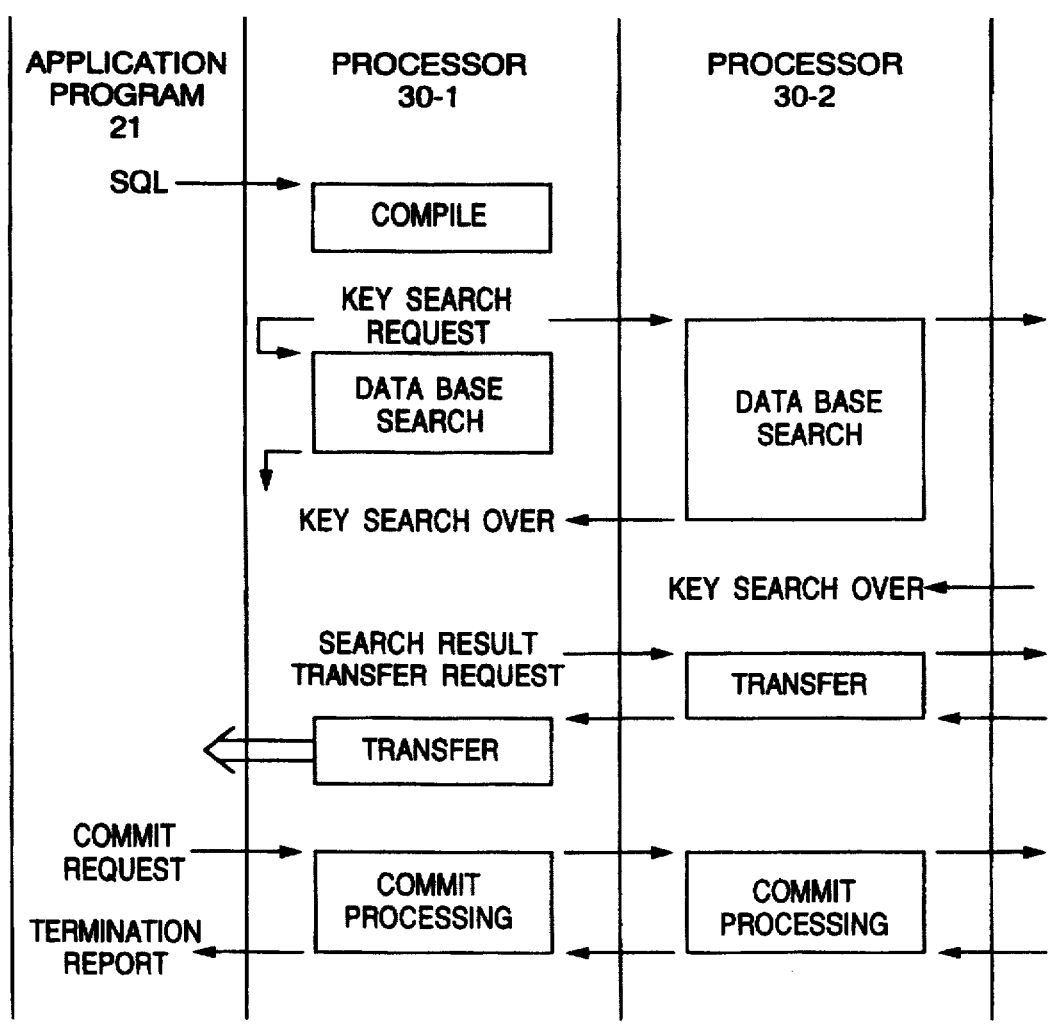
FIG. 2 is a diagram for explaining the operation of the system shown in FIG. 1 taking the data base search as an example.

FIG. 2 is a diagram for explaining the operation of the system shown in FIG. 1 taking the data base search as an example. This embodiment is concerned with the case in which a processor receiving the structured query language (SQL) statement accesses a relational data base. Nevertheless, the invention is applicable with equal effect to other types of data base systems. FIG. 2 is assumed to show the time elapsing downward. For convenience of explanation, reference numerals 30-1, 30-2 and so on are attached for distinguishing the processors 30 from each other. A relational data base is assumed to constitute a plurality of data bases 50, 51 and so on distributed and stored according to the key range thereof. When a SQL statement is sent to a data base access controller 31 of the processor 30-1 through a communication path 25 from an application program 21, the data base access controller 31 compiles the particular SQL statement. According to the result of compilation, the data base access controller 31 transmits by broadcasting a key search request to the data base access processing sections 32 of the other processors 30-2, etc., through an inter-processor communication unit 35. The key search request is issued also to the data base access processing section 32 of the processor 30-1. The data base access processing section 32 of each processor 30 searches the data base for the key range held by the distributed data base. Upon termination of the data base search, each data base access processing section 32 reports the completion of key search to the data base access controller 31 of the processor 30-1. The data base access controller 31 transmits a search result transfer request to the data base access processors 32 of the other processor 30-2, 30-3 and so on. In this way, upon collection of the search result from each data base access processing section 32, the data base access controller 31 consolidates and transmits the search result to the application program 21. Upon receipt of a commit request from the application program 21, the data base access controller 31 sends a commit request to each data base access processing section 32. Each data base access processing section 32 performs a commit control or a commit control processing. Upon receipt of a report on the commit control or commit processing, the data base access controller 31 consolidates the processing result and reports the termination of the processing to the application program 21. During this operation, the control function is transferred from the data base access controller 31 or each data base access processing section 32 to the history information acquisition section 33 of each processor 30 at the time points of initiation of SQL compilation, termination of SQL compilation, initiation of transmission of the key search request, termination of transmission of the key search request, initiation of data base search and termination of data base search. Each history information acquisition section 33 stores the time of occurrence and contents of each event, the number of transfer bytes, the number of processes performed, etc. as the operation history information in a storage unit, and returns the control function to the data base access controller 31 or each data base access processing section 32. In the case where a request is issued from the history information collector 41 of the processor 40 after acquisition of the history information for a predetermined length of time, each history information acquisition section 33 transmits the history information stored in the storage unit to the history information collector 41 through a inter-processor communication unit 36.

FIG. 3 is a diagram showing an example of data format of the specified inter-processor operation time information stored in the region 43. The processing request type represents the contents of the processing request transmitted from the application program 21 to the data base access controller 31 or from the data base access controller 31 to the data base access processing sections 32 of the other processors 30-2, and so on. The SQL compile request is a processing request sent from the application program 21 to the data base access controller 31, and the other processing requests are sent from the data base access controller 31 to the data base access processing sections 32. The specified processing time is a time allowable for each unit data length from the initiation of transfer of the processing request to the termination of the transfer/processing execution, and the unit information length represents the length of the data transferred/processed within the specified processing time. These parameters are set by the processor 40 in a table 43 before the system operation described above.

FIG. 4 is a diagram showing a data format of the specified intra-processor time information stored in the region 44. The processing type represents the contents of the processing performed in the processor in response to a processing request shown in FIG. 3, which correspond to the processing request types shown in FIG. 3, respectively. The SQL compile operation is a processing performed by the data base access controller 31, and the other items are the processes performed by the data base access processing section 32. The specified processing time is a time length allowed for each unit number of processes executed from the initiation to termination of a processing. Some processing type may use the unit information length instead of the unit number of processes. These parameters are also prepared in the region 44 before initiation of the system operation together with the parameters of the region 33 described above.

FIG. 5 is a diagram showing an example of data format of the accumulated history information stored in the region 45. The time information is stored in terms of hours, minutes, seconds and milliseconds indicating the time point when an event occurs. The processing request type represents any event occurred by the type of processing request or by the type of processing. The processor name is an ID code of the processors 30-1, 30-2 and so on. The number of processes is the number of transfer bytes or the number of the processes performed. Always one process is accepted at a time. The number of processes associated with the completion of key search is the number of data hit as a result of search. The processing condition indicates whether the processing result is normal or abnormal. In FIG. 5, the time between items 1 and 2 and the time between items 1 and 3 are mainly the inter-processor transfer time. The time between items 2 and 5 and the time between items 3 and 4, on the other hand, represent the intra-processor processing time.

Figure 6:
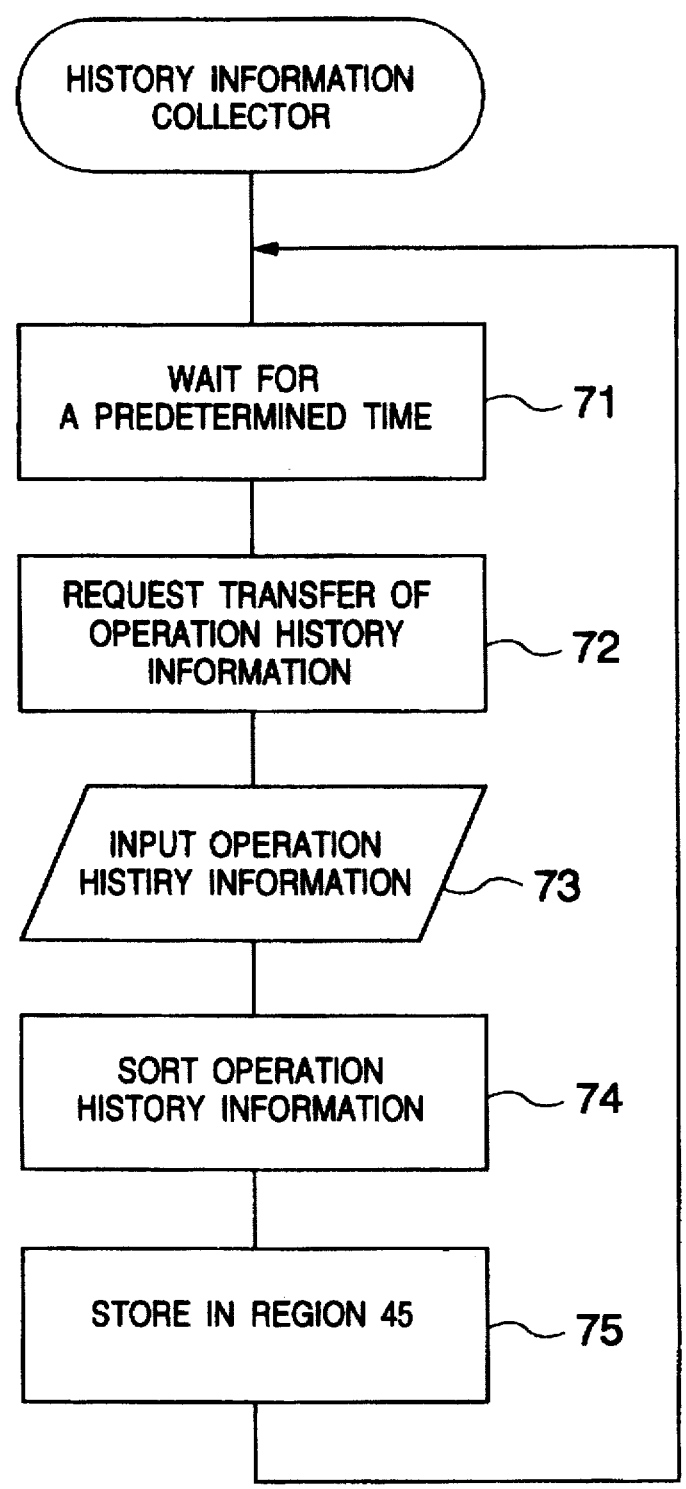
FIG. 6 is a flowchart showing the processing flow of a history information collector 41 according to an embodiment.

FIG. 6 is a flowchart showing the flow of process in the history information collector 41. The history information collector 41 transmits a request for transferring the operation history information accumulated thus far to the history information acquisition section 33 of each processor 30 (step 72) after the lapse of a predetermined time (step 71). The operation history information, after being received from each history information acquisition section 33 (step 73), is sorted with the time as a first key, the processing request type as a second key and the processor name as a third key (step 74). The accumulated history information is stored in the region 45 (step 75), and the process is returned to step 71. The time is sorted in the direction of time lapse. The accumulated history information is stored in the region 45 as shown in FIG. 5.

Figure 7:
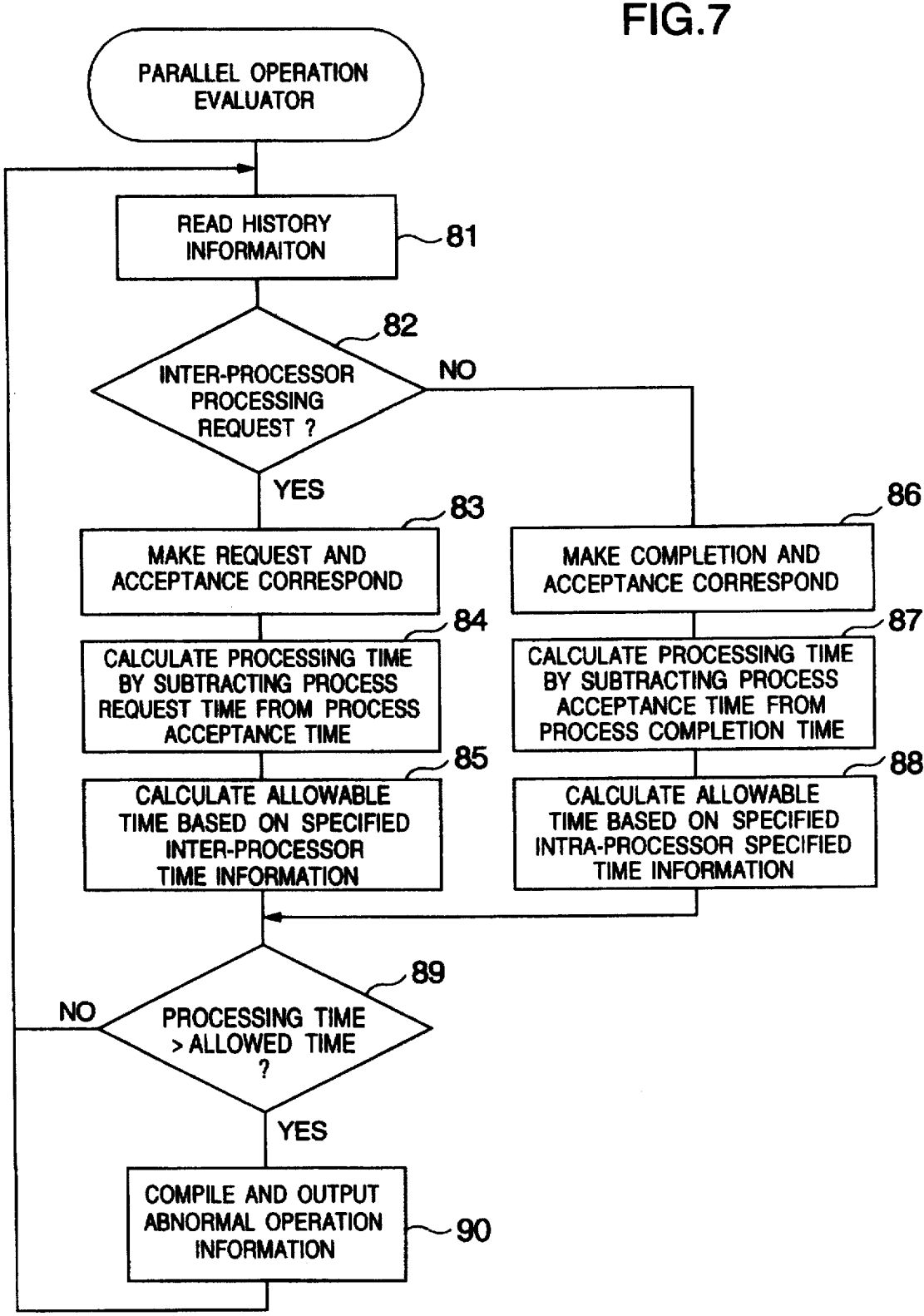
FIG. 7 is a flowchart showing the processing flow of a parallel operation evaluator 42 according to an embodiment.

FIG. 7 is a flowchart showing the flow of the process for the parallel operation evaluator 42. The parallel operation evaluator 42 reads from the region 45 the unprocessed history information (information on a line carrying an item number in FIG. 5) with a normal processing condition (step 81), and decides from the processing request type whether the inter-processor request or the intra-processor processing is involved (step 82). The request labelled the key search request is an inter-processor request and those requests not labelled the key search are the intra-processor processing. For an inter-processor request (YES at step 82), the request and acceptance are made to correspond to each other with reference to the subsequent history information (step 83). The key search request and the key search acceptance are made to correspond to each other, for example. This correspondence should occur in an number equal to the number of the other processors 30-2 and so on. The processing acceptance time minus the processing request time is calculated for each correspondence thereby to determine the processing time (step 84). A major portion of this processing time represents the information transfer time between the processors. As the next step, the allowable time AC/B plus a predetermined time α is calculated as an allowable time for the length of the history information (C) with reference to a specified processing time (A) and a unit information length (B) with respect to the corresponding processing request type of the specified inter-processor operation time information stored in the region 43 (step 85). If the intra-processor processing is involved (NO in step 82), the completion and acceptance are made to correspond to each other with reference to the information having the same processor name in the subsequent history information (step 86). The key search (data base search) completion and the key search (data base search) acceptance, for example, are made to correspond to each other. Next, the processing completion time minus the processing acceptance time is calculated for this particular correspondence thereby to determine the processing time (step 87). Then, the allowable time DF/E plus a predetermined time β is calculated for the number F of the processes of the history information with reference to the specified processing time D and the unit number of processes with respect to the corresponding processing type of the specified intra-processor operation time information stored in the region 44 (step 88). Upon calculation of the processing time and the allowable time in this way, the processing time is compared with the allowable time (step 89). Unless the processing time is larger than the allowable time (NO in step 89), the process returns to step 81. In the case where the processing time is larger than the allowable time (YES in step 89), on the other hand, information on abnormal operation is compiled and displayed or printed on an output unit 60 (step 90), followed by the process returning to step 81. The output information, as shown in FIG. 2, is readily visible when illustrated to indicate the start, end and the contents of processing performed in each processor according to the lapse of time with an abnormality mark attached to the processing request or the processing associated with an abnormal operation time. As described above, the process is continued until the unprocessed history information disappears from the region 45.

The system performance can be tuned up on the basis of the abnormal operation information described above. In the case where the inter-processor processing time is long, the problem is posed of the performance or the communication control hardware/software of the communication path or the inter-processor communication equipment. When the intra-processor processing time is long, the probable problem is a slow CPU performance, an insufficient number of input-output buffers, or contention of access among the data bases 50, 51 and so on. The insufficiency of the number of input-output buffers can be accommodated by an increased number. If the contention of input-output access is problematic, on the other hand, the data bases can be subdivided for achieving a distributed effect. Although the foregoing embodiments are explained with reference to the case of a parallel relational data base, the present invention is applicable with equal effect to the data bases of other types.

Figure 8:
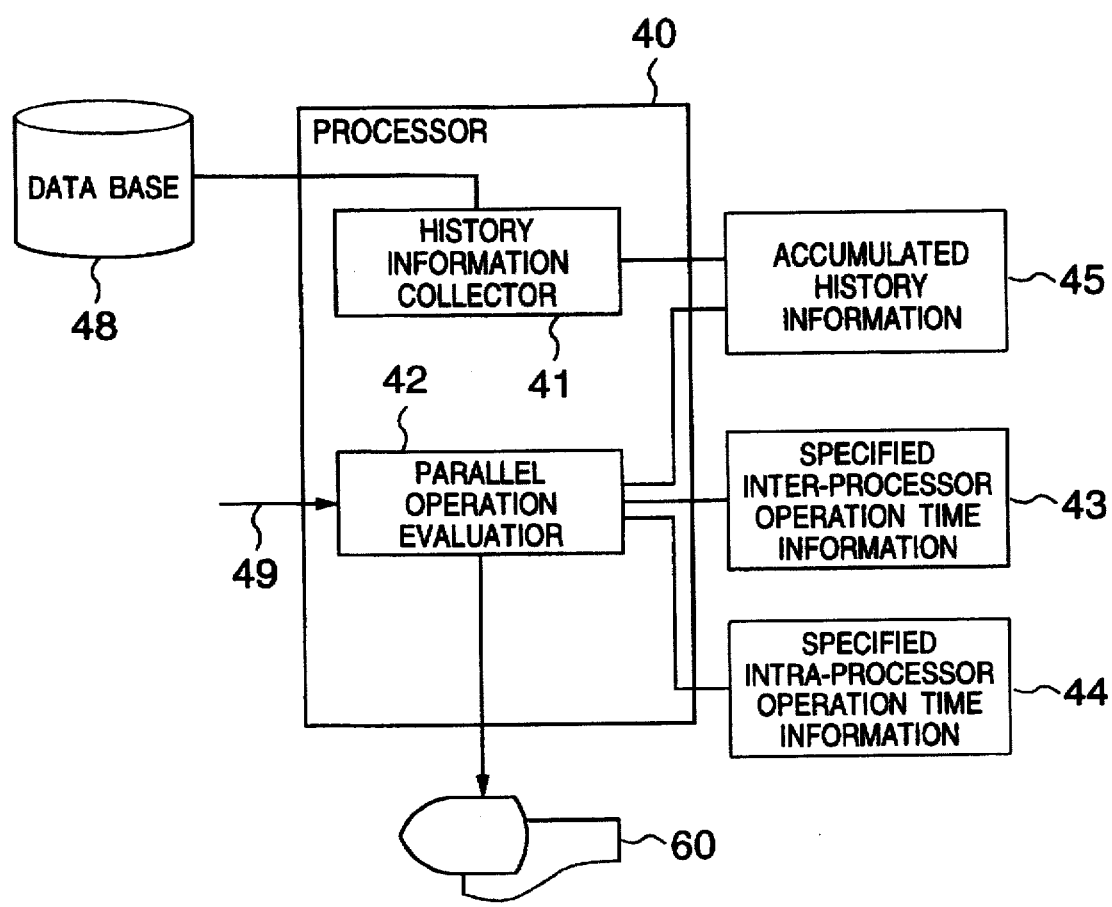
FIG. 8 is a block diagram showing a parallel data base history information analysis system according to another embodiment of the invention.

FIG. 8 is a diagram showing a system for analyzing the history information in a parallel data base according to another embodiment of the invention. The blocks having the same functions as those in FIG. 1 are designated by the same reference numerals respectively as in FIG. 1. The history information obtained by data base access in the parallel data base system shown in FIG. 1 is already sent and stored in a data base 48. A processor 40 obtains predetermined specified inter-processor time information 43, predetermined specified intra-processor time information 44 and history information stored in the data base 48. The processor 40 thus can collect the history information as shown in FIG. 6 on one hand and can evaluate the parallel operation as shown in FIG. 7 on the other hand. The abnormal operation information thus obtained can be used for improving the parallel data base system.

In another embodiment, the contents of the operations to be made by the processor 40 can be transmitted as codes from the processor 30-1 via a communication line 49 to prepare the parallel operation evaluator 42 for execution of collecting the history information and evaluating the parallel operation by the processor 40.

Further, the contents of the operations or the program codes can be stored in a storage medium (not shown) by the processor 30-1 to provide the processor 40 with a function of these operations in the processor 40 after mounting the medium on the storage system of the processor 40.

We claim:

1. A method for analyzing the operation of a parallel data base system, comprising the steps of:
    executing an access to a plurality of data bases connected to a plurality of processors respectively from a second processor that has received a request for accessing said data bases from a first processor;
    collecting history information of access to the data bases executed by said second processor, an ID of said second processor and data amount of said access;
    storing in a memory a predetermined specified time for the access to a unit amount of data in a data base; and
    deciding whether said history information for said accessed data amount is reasonable or longer than the time assumed from said predetermined specified time for said unit amount of data.

2. A method according to claim 1, further comprising the step of displaying at least the ID of said second processor and the decision result on a display unit when said decision means decides that said history information is longer than said assumed time.

3. A method according to claim 2, further comprising the step of multiplying said collected access data amount by said predetermined specified time and dividing the product by said unit amount in order to obtain said assumed time.

4. A method according to claim 3, further comprising the step of determining said assumed time by adding a predetermined redundancy value to said quotient.

5. A method according to claim 1, further comprising the steps of:
    collecting the transfer history information of said access request transferred from said first processor;
    storing in a memory a predetermined specified time for the transfer of a unit amount of data between said first processor and said second processor; and
    deciding whether the difference between said history information and said transfer history information between said first processor and said second processor is longer than the transfer time assumed from said predetermined transfer specified time for transfer of said unit amount of data.

6. A method according to claim 5, further comprising the step of displaying at least the ID of said second processor and the transfer decision result on a display unit in the case where said decision means decides that said difference is longer than said assumed transfer time.

7. A method according to claim 6, further comprising the step of displaying at least the ID of said second processor and the decision result on a display unit in the case where said decision means decides that said history information is longer than said assumed time.

8. A method according to claim 7, further comprising the step of multiplying said collected access data amount by said predetermined specified time and dividing the product by said unit amount in order to determine said assumed time.

9. A method according to claim 8, further comprising the step of determining said assume time by adding a predetermined redundancy value to said quotient.

10. A method for analyzing the operation of a parallel data base system, comprising the steps of:
    collecting from a plurality of data bases connected respectively to a plurality of processors history information of the access executed by a second processor to said data bases, the ID of said second processor and the data amount of said access, said second processor having received from a first processor a request for access to said data bases;
    storing in a memory a predetermined time specified for access to a unit amount of data in said data bases; and
    deciding whether said history information for said data amount of said access is reasonable or longer than the time assumed from said predetermined specified time for said unit amount of data.

11. A method according to claim 10, further comprising the step of displaying at least the ID of said second processor and said decision result on a display unit in the case where said decision means decides that said history information is longer than said assumed time.

12. A method according to claim 11, further comprising the step of multiplying said collected access data amount by said predetermined specified time and dividing the product by said unit amount in order to determine said assumed time.

13. A method according to claim 11, further comprising the steps of:
    collecting from said data bases the transfer history information of said access request transferred from said first processor;
    storing in a memory a predetermined transfer time specified for the transfer of a unit amount of data between said first processor and said second processor; and
    deciding whether the difference between said history information and said transfer history information for transfer between said first processor and said second processor is reasonable or longer than the transfer time assumed from said predetermined transfer time specified for the transfer of said unit amount of data.

14. A method according to claim 13, further comprising the step of displaying at least the ID of said second processor and the transfer decision result on a display unit in the case where said decision means decides that said difference is longer than said assumed transfer time.

15. A method according to claim 14, further comprising the step of displaying at least the ID of said second processor and said decision result on a display unit in the case where said decision means decides that said history information is longer than said assumed time.

16. A method according to claim 15, further comprising the step of multiplying said collected access data amount by said predetermined specified time and dividing the product by said unit amount in order to determine said assumed time.

17. A method according to claim 13, further comprising the step of chronologically sorting said collected transfer history information of said access request transferred from said first processor and said collected history information of the data base access executed to said data bases from said second processor.

18. A system for analyzing the operation of a parallel data base system, comprising:
    a plurality of data bases connected to a plurality of processors and having history information of the access executed to said data bases by a second processor that has received a request to said data bases from a first processor;
    means for collecting from said data bases history information of the access executed to said data bases by said second processor, the ID of said second processor and the data amount of said access;

a first memory for storing a predetermined time specified for access to a unit amount of data in said data bases; and evaluation means for deciding whether said history information of said accessed data amount is longer than the time assumed from said predetermined time specified for said unit amount of data.

19. A system according to claim 18, wherein:

said collection means collects from said data bases the transfer history information for said access request transferred from said first processor;

said system further comprising a memory for storing a predetermined time specified for transfer of a unit amount of data between said first processor and said second processor;

said evaluation means deciding whether the difference between said history information and said transfer history information for transfer between said first processor and said second processor is reasonable or longer than the transfer time assumed from said predetermined transfer time specified for said unit amount of data.

20. A system for analyzing the operation of a parallel data base system, comprising:

a plurality of processors connected in parallel to each other for executing an application program, each of said processors having a data base and executing a data base access request received from said application program;

means for collecting the history information of the access executed by a given processor to said data bases, the ID of said processor and the data amount of said access;

a memory for storing a predetermined time specified for the access to a unit amount of data in said data bases; and means for deciding whether said history information for said accessed data amount is longer than the time assumed from said predetermined time specified for said unit amount of data.

21. An apparatus for analyzing the operation of a parallel data base system, comprising:

a plurality of processors connected in parallel to each other for executing an application program, each of said processors having a data base and executing a data base access received from said application program;

means for collecting the history information of the access executed by a second processor to said data bases connected respectively to said processors according to an access request received from a first processor, the IDs of said first processor and said second processor, the transfer history information of the access request transferred from said first processor and the data amount of said access;

a memory for storing a predetermined time specified for the access to a unit amount of data in said data bases;

a memory for storing a predetermined transfer time specified for the transfer of said unit amount of data between said first processor and said second processor; and means for deciding whether said history information of said accessed data amount is longer than the time assumed from said predetermined time specified for said unit amount of data and also deciding whether the difference between said history information and said transfer history information for the transfer between said first processor and said second processor is reasonable or longer than the transfer time assumed from said predetermined transfer time specified for the transfer of said unit amount of data.

22. A method of providing with parallel database analyzing function to a computer, comprising:

preparing computer codes corresponding to functions of:

collecting history information of access to the data bases executed under a request from a first processor by a second processor, an ID of said second processor and data amount of said access;

storing in a memory a predetermined specified time for the access to a unit amount of data in a data base; and deciding whether said history information for said accessed data amount is reasonable or longer than the time assumed from said predetermined specified time for said unit amount of data in said first processor, and transmitting said computer codes via a transmission line to said computer for execution of said parallel database analyzing function therein.

23. A storage medium for parallel database operation analysis storing therein computer codes for functions of:

collecting history information of access to the data bases executed under a request from a first processor by a second processor, an ID of said second processor and data amount of said access;

storing in a memory a predetermined specified time for the access to a unit amount of data in a data base; and deciding whether said history information for said accessed data amount is reasonable or longer than the time assumed from said predetermined specified time for said unit amount of data prepared by a first processor for execution of said parallel database operation analysis in a second processor.

* * * * *